J. F. CROWE.
LEAF AND RUBBISH GATHERING MACHINE.
APPLICATION FILED JAN. 31, 1910.
969,138.
Patented Aug. 30, 1910.
2 SHEETS—SHEET 1.
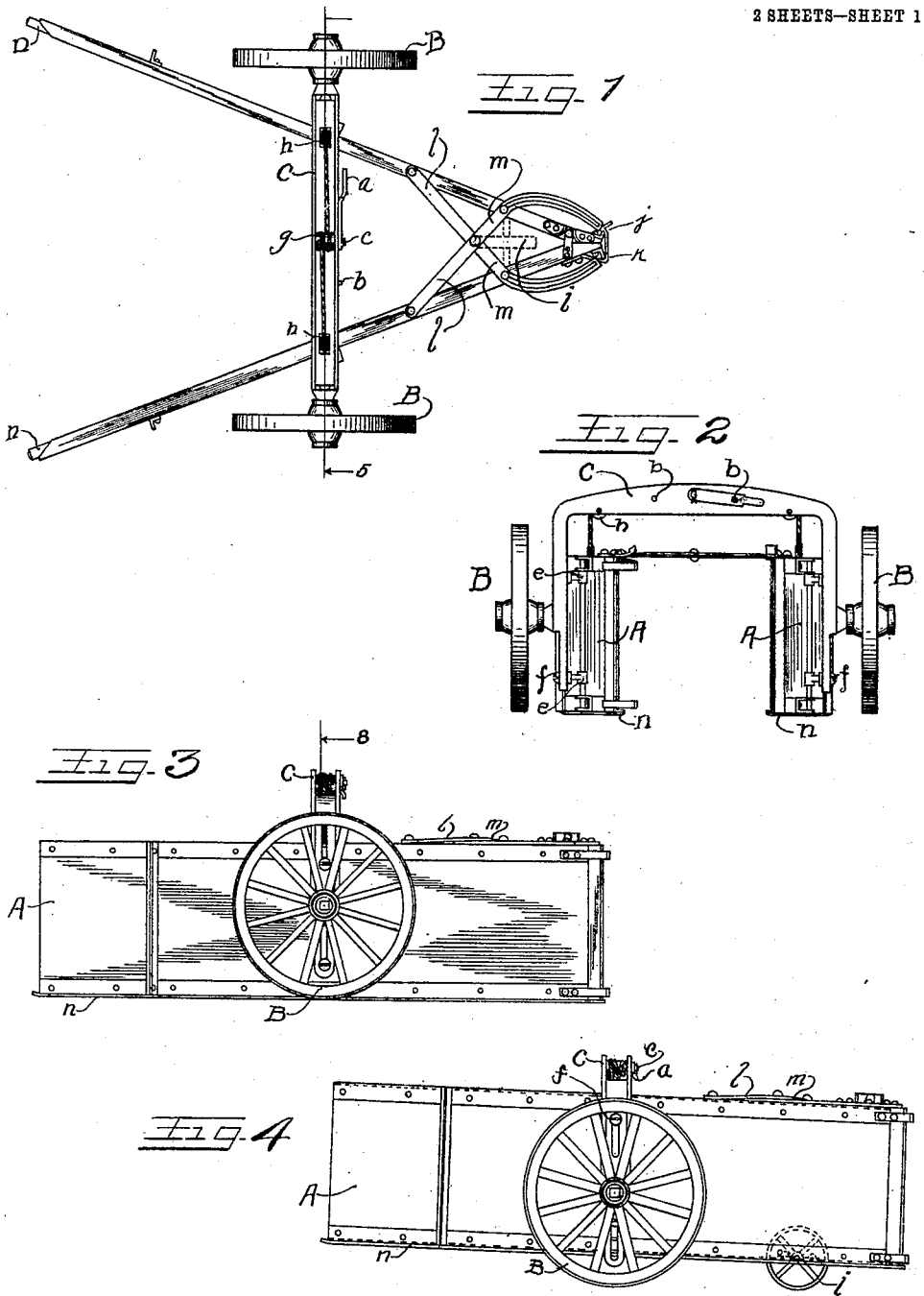
Witnesses
Mott B. Corcoran
Guy F. Stinchfield
Inventor
Jos. F. Crowe.
by Edgerton W. Agar,
Atty.

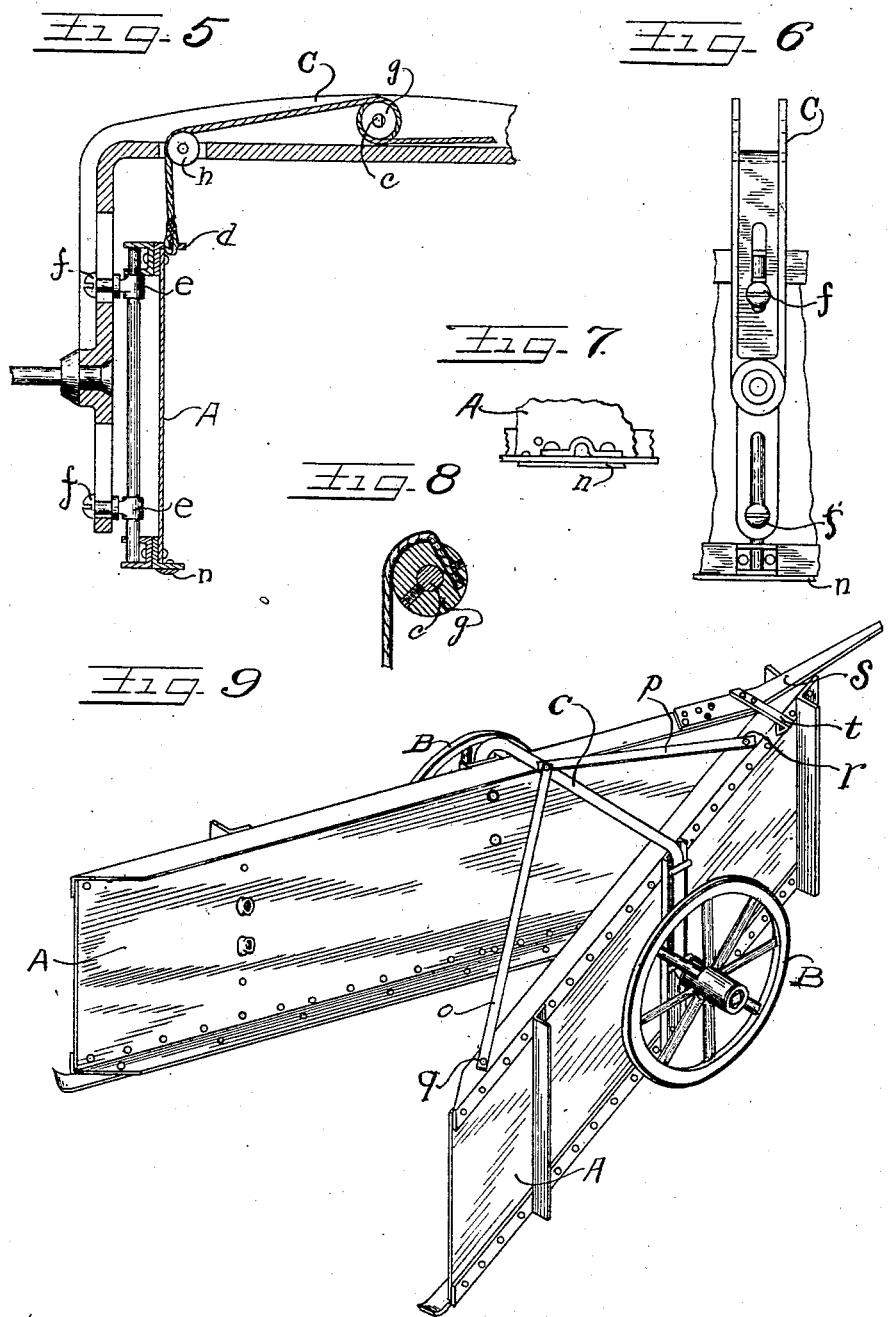

UNITED STATES PATENT OFFICE.

JOSEPH F. CROWE, OF VALPARAISO, INDIANA.

LEAF AND RUBBISH GATHERING MACHINE.

969,138. Specification of Letters Patent. Patented Aug. 30, 1910.

Application filed January 31, 1910. Serial No. 541,204.

*To all whom it may concern:*

Be it known that I, JOSEPH F. CROWE, a citizen of the United States, residing at Valparaiso, in the county of Porter and State of Indiana, have invented a new and useful Leaf and Rubbish Gathering Machine, of which the following is a specification.

My invention relates to improvements in leaf and rubbish gathering machines by means of which when drawn along the street, in the gutter, or any place where leaves and rubbish accumulate, the leaves and rubbish are forced into piles by the sides of the machine; and the objects of my improvements are, first, to provide a machine that will gather leaves and rubbish that cannot successfully be gathered by the ordinary street sweeper and leave the leaves and rubbish in piles so the same may be quickly carted away; second, to provide a machine that will gather and leave in piles the rubbish and dirt that may be swept into the gutters of the street by the street sweeper; third, to make a machine that will, when being hauled over dirt and gravel streets, level these streets by cutting off the high and filling the low places therein; fourth, to make a machine that will do this gathering of leaves and rubbish and leveling of streets more thoroughly and considerably cheaper than the same has ever been done before. I attain these objects in this machine by the mechanism illustrated and explained in the accompanying drawings, in which—

Figure 1 is a top view of this machine, showing the axle, wheels, sides, and the devices for opening and closing and raising and lowering the machine; Fig. 2, a rear view of the machine as it is moving from the operator, the machine being open and in the act of dumping the leaves and rubbish into a pile, also showing the construction of the lever, pulleys, cable, rope, or wire, and perpendicular rods, used in raising and lowering the sides of the machine; Fig. 3, a sectional part of the machine, showing one wheel, one side, and a part of the small windlass, and showing, too, the method of attaching cables, ropes, or wires, which windlass, cables, ropes, or wires are used to raise and lower the sides of the machine; Fig. 4, the same as Fig. 3, with the addition of a detachable small wheel used when moving the machine from place to place, which small wheel may be removed when the machine is being used for gathering leaves and rubbish; Fig. 5, a section of the machine, showing the grooves in which the devices for raising and lowering the sides of the machine operate, as well as showing more completely the pulleys, cables, ropes, or wires which are used in operating said devices; Fig. 6, a section of the machine, showing the casting used in raising and lowering the sides of the machine, the wheels, pulleys, and windlass being removed; Fig. 7, a device to be placed at the bottom and rear of each side into which the axle of the said small wheel is placed when moving the machine from place to place; Fig. 8, a section of the windlass, showing the mode of attaching the cable, rope, or wire to the pulley; Fig. 9, a modified form of the machine without the devices for raising and lowering the sides, and also without the said small wheel used in moving the machine from place to place, and showing by the two rods extending from the axle to one side a method of holding this side in the position it now is while the opposite side may be operated by lifting the dog with the handle extending over the rear and top of the machine, and thus releasing this opposite side so that the pressure of the leaves and rubbish within the machine will push apart, at the rear end of the machine, the sides and allow the machine to move forward leaving the leaves and rubbish in a pile, thus emptying the machine, when the operator can bring together the rear ends of the sides by the use of said handle, allowing this dog to hold firmly together these ends when the machine may continue to gather leaves and rubbish as before.

Similar letters refer to similar parts throughout the several views.

The sides A A, the wheels B B, and the axle C constitute the framework of the machine.

In Fig. 1, the crank *a* may be moved so the handle of said crank attaches to projection *b*, unrolling the cable, rope, or wire on roller *c*, allows the sides A A to lower to the ground, the grooves and shafts for this operation being clearly shown in Fig. 5. Further, in Fig. 5, the cable, rope, or wire passes around block *g* and over block *h*, and fastens at *d*, at the upper part of side A. The operating of this cable, rope, or wire allows side A to move up and down through clasps *e e*, which clasps *e e* may be loosened or tightened at the points *f f*, thus further adjusting the raising and lowering of the sides A A.

When it is desired to move the machine from place to place, without operating it, the machine may be left open at the rear as shown in Fig. 2, the sides A A raised from the ground as herein described, and the small wheel *i* as shown in Fig. 4 attached at the bottom and rear of the sides A A by placing the ends of the axle of said small wheel in the device shown in Fig. 7, which device is attached at the bottom and rear of the sides A A as heretofore described. In Fig. 1 the dog *j k* holds together firmly the ends of the cross bars *l m* placed at the top and on the rear of the sides A A, thus keeping together the rear ends of the sides A A and closing the machine, making it ready for operation. The machine (Fig. 1) moving forward the leaves and rubbish are forced into the machine through the space between *n n*, and crowded into a compact form between the sides A A and under the axle C until this space between the sides A A is filled; the operator then loosens the dog *j k*, allowing the cross bars *l m* to spread apart at the points *m m*, by means of the slotted curved portions passing over the studs passing through the slots and secured to the top of the side members A—A, thus allowing the sides A A at the rear to also spread apart, and so perform the operation of dumping or leaving the leaves and rubbish in a compact pile. After the machine moves forward to a point relieving itself of the leaves and rubbish, the operator brings the rear ends of the sides A A together and fastens said dog *j k* as shown in Fig. 1, the machine now being ready to move forward as before.

In Fig. 9, the modified form of said machine (if the devices for raising and lowering the sides and the small wheel *i* in Fig. 4 are not desired) the bars *o p* extending from the axle C to the top of side A at the points *q* and *r* are firmly fastened, thus holding this side in the position it now is as shown in said Fig. 9, and allowing the operator to use a handle substantially like *s* and a dog substantially like *t* for opening and closing the rear ends of the machine when it is being used, this operation being substantially the same as herein described about Fig. 1.

I claim:

1. In a device of the character described, supporting wheels, a supporting frame having vertical side portions and a top connecting portion, axles for the wheels extending outward from each of the vertical portions, side members pivotally mounted and adjustable vertically upon the side portions of the frame, and means to secure the adjacent ends of the side members to each other.

2. In a device of the character described, supporting wheels, a supporting frame having wheel axles on each side thereof, vertical portions extending above and below the axles and an upper horizontal joining portion, guide members adjustably secured to the vertical portion, side members, means upon the side members slidingly and rotatably engaging the guiding members, means for raising and lowering the side member carried upon the horizontal joining portion of the frame, and means for securing the adjacent ends of the side members together.

JOSEPH F. CROWE.

Witnesses:
 HANNIBAL H. LORING,
 GUY F. STINCHFIELD,
 WILLIAM H. WILLIAMS.